(12) United States Patent
Hoxha et al.

(10) Patent No.: US 9,371,230 B2
(45) Date of Patent: *Jun. 21, 2016

(54) DIHYDRATE-HEMIHYDRATE PROCESS FOR PRODUCING PHOSPHORIC ACID

(75) Inventors: Antoine Hoxha, Neuville-en-Condroz (BE); Dorina Fati, Neuville-en-Condroz (BE)

(73) Assignee: Prayton Technologies, Engis (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/122,381

(22) PCT Filed: Jun. 1, 2011

(86) PCT No.: PCT/EP2011/059128

§ 371 (c)(1),
(2), (4) Date: Dec. 11, 2013

(87) PCT Pub. No.: WO2012/163425

PCT Pub. Date: Dec. 6, 2012

(65) Prior Publication Data

US 2014/0120020 A1 May 1, 2014

(51) Int. Cl.
*C01B 25/231* (2006.01)
*C01B 25/228* (2006.01)
*C01B 25/222* (2006.01)

(52) U.S. Cl.
CPC ............. *C01B 25/222* (2013.01); *C01B 25/231* (2013.01); *C01B 25/228* (2013.01)

(58) Field of Classification Search
CPC ....................................... C01B 25/222–25/232
See application file for complete search history.

(56) References Cited

U.S. PATENT DOCUMENTS

| 3,523,754 | A | | 8/1970 | Yoshito et al. |
| 3,935,298 | A | * | 1/1976 | Sugahara et al. ............. 423/320 |
| 3,984,525 | A | | 10/1976 | Williams et al. |
| 4,136,151 | A | | 1/1979 | Beaumont et al. |

(Continued)

FOREIGN PATENT DOCUMENTS

| CA | 915883 | 12/1972 |
| FR | 1485940 | 6/1967 |

(Continued)

OTHER PUBLICATIONS

Schrödter K et al: "Ullmann's Encyclopedia of Industrial Chemistry—Phosphoric Acid and Phosphates", Ullmann's Encyclopedia of Industrial Chemistry, Jan. 15, 2008, pp. 1-48, XP002593034.

*Primary Examiner* — Anthony J Zimmer
*Assistant Examiner* — Justin Bova
(74) *Attorney, Agent, or Firm* — McCracken & Gillen LLC

(57) ABSTRACT

A method for producing phosphoric acid, comprising attack in an aqueous medium of phosphated rock with sulfuric acid, with formation of a first dihydrate slurry suspended in an aqueous phase having a free $P_2O_5$ content between 38 and 50% and a free $SO_3$ content of less than 0.5%, conversion of this first slurry by heating with recrystallization of the solubilized calcium sulfate giving rise to a second hemihydrate slurry, and separation in the second slurry between a production phosphoric acid and a hemihydrate cake, characterized in that it comprises during the attack, addition of a fluorine source in the first slurry in a content from 1% to 5% by weight of F relatively to the $P_2O_5$ contained in the phosphated rock.

10 Claims, 2 Drawing Sheets

(56) References Cited

U.S. PATENT DOCUMENTS

| | | | |
|---|---|---|---|
| 4,588,570 A | | 5/1986 | Davister et al. |
| 4,777,027 A | * | 10/1988 | Davister et al. ............... 423/320 |
| 5,093,088 A | | 3/1992 | Derdall et al. |
| 2004/0047790 A1 | | 3/2004 | Feng et al. |

FOREIGN PATENT DOCUMENTS

| | | |
|---|---|---|
| GB | 1164836 | 9/1969 |
| JP | 2003054944 | 2/2003 |
| WO | WO 2005/118470 | 12/2005 |

* cited by examiner

DIHYDRATE-HEMIHYDRATE PROCESS FOR PRODUCING PHOSPHORIC ACID

CROSS-REFERENCE TO RELATED APPLICATIONS

This application is a §371 national stage entry of International Application No. PCT/EP2011/059128, filed Jun. 1, 2011, the entire contents of which is incorporated herein by reference.

The present invention relates to a method for producing phosphoric acid by attack of phosphated rock by means of sulfuric acid.

The standard method of this type consists of reacting phosphated rock with sulfuric acid under conditions giving rise to crystallization of calcium sulfate dihydrate or gypsum ($CaSO_4.2H_2O$). The gypsum slurry obtained in a first reactor may then be subject, in a second reactor, to ripening allowing enlargement of the sulfate grains obtained, and this in order to increase filterability. The ripened slurry is then filtered, with phosphoric acid being obtained, having a free $P_2O_5$ content of the order of 25 to 35% by weight. The obtained gypsum still contains enough $P_2O_5$, either non-attacked, or co-crystallized, i.e. set in the crystalline lattice of gypsum. This limits the extraction yield of $P_2O_5$ contained in the phosphate and makes the gypsum unsuitable for certain applications.

Methods for producing phosphoric acid by attack with sulfuric acid giving, at higher temperatures and at $P_2O_5$ and/or $SO_3$ concentrations, a calcium sulfate slurry in the form of a hemihydrate ($CaSO_4.\frac{1}{2}H_2O$) or anhydrite, are also known. These methods generally give a concentrated phosphoric acid and a well filterable sulfate, but the $P_2O_5$ extraction yield of these methods is less than the standard method. In certain cases, after this attack, it is also proceeded with conversion of the obtained calcium sulfate hemihydrate into calcium sulfate dihydrate (c.f. Schrödter et al., Phosphoric Acid and Phosphates, Ullman's Encyclopedia of Industrial Chemistry, 2008, pages 8 and 9).

Methods comprising triple crystallization of calcium sulfate first as a hemihydrate and then as a dihydrate and finally again as a hemihydrate, are also known (c.f. U.S. Pat. No. 4,588,570).

With view to improving the results of the standard method, provision was made, after separating the production phosphoric acid from the gypsum slurry, for mixing the remainder of the latter with concentrated sulfuric acid and optionally for heating the whole, in order to convert gypsum into calcium sulfate hemihydrate. The thereby formed second slurry is in turn filtered and the acid filtrate is recycled to the attack step (see FR 1485940). This method clearly improves the $P_2O_5$ extraction yield. Indeed, $P_2O_5$ co-crystallized in gypsum during the attack is released during solubilization of gypsum crystals, while calcium sulfate recrystallized as a hemihydrate, is very pure and extremely well filterable. However this method requires two filtrations, i.e. two filters, whence enormous congestion of the installation on an industrial scale.

According to an alternative of this method, provision was made, after having applied the conditions of the standard method for forming a gypsum slurry, for directly subjecting the latter to mixing with sulfuric acid and optionally to heating, without separating beforehand the production phosphoric acid therefrom. The obtained hemihydrate slurry is filtered while obtaining a very pure hemihydrate cake, but a filtrate formed with a mixture of phosphoric acid and sulfuric acid. In order to obtain a quality production phosphoric acid, this mixture has then to be subject to a desulfation installation, which therefore does not solve the congestion problems.

Other methods for producing phosphoric acid very similar to the previous one are further known, comprising a conversion of dihydrate into hemihydrate and having the same drawbacks (GB-1,164,836; U.S. Pat. No. 3,984,525).

Finally a method is known in which the phosphated rock is again subject to attack conditions of the standard method so as to obtain a first slurry in which the formed gypsum has a grain size allowing good filtration. A portion of this first slurry is then sampled and subject to conditions under which the gypsum is converted into a hemihydrate, while thereby forming a second slurry. The remainder of the first slurry is then mixed with the second and the whole is filtered (see WO 2005/118470).

A major problem in the production of phosphoric acid lies in the depletion of $P_2O_5$-rich phosphate ore deposits. These deposits have been exploited. Presently it is necessary to turn towards ores for which the $P_2O_5$ concentration is considered as poor, for example $P_2O_5$ contents of 30% by weight or less as compared with phosphated rock, and in certain cases 20% or less.

A method allowing exploitation of such ores and extraction therefrom of a high quality production phosphoric acid was described in the international patent application PCT/EP2010/068709 not yet published. The attack conditions of this method provide a substantially stoichiometric reaction between the introduced sulfuric acid and the calcium contained in the phosphated rock, while the free $P_2O_5$ content in the crystallization slurry is maintained high between 38 and 50% by weight and the temperature between 70 and 90° C. Surprisingly, these conditions give rise to very fine crystals of stable dihydrate. This slurry is then subject to an increase in temperature during which the dihydrate grains solubilize and release the non-attacked or co-crystallized $P_2O_5$, while crystallization of calcium sulfate hemihydrate which is well filterable and a production phosphoric acid with very low free $SO_3$ content are obtained.

It should be noted that frequently these ores poor in $P_2O_5$ further have increasingly high contents of impurities. The content of impurities is commonly expressed by the ratio ($Al_2O_3+Fe_2O_3+MgO)/P_2O_5\times100$, also noted as MER (Minor Element Ratio). So-called standard phosphates are characterized by an MER ratio from about 5 to 8. Beyond 10, the impurity content is so large that it begins to negatively influence the crystallization of calcium sulfate as gypsum during the attack of the ore by sulfuric acid. At these impurity contents, the production of phosphoric acid becomes a problem, notably because of difficulties in crystallization of calcium sulfate dihydrate and in filtration of the latter. This therefore has a great disadvantage in all the methods where filtration directly occurs after attack of the phosphated rock.

In a method as described in the non-published patent application PCT/EP2010/068709, gypsum crystallization is also affected by the impurities, but given that this gypsum is not intended to be filtered, this does not have any consequence.

However, the step for converting the dihydrate slurry into a hemihydrate slurry proves to be laborious in the case of a phosphate ore with a high impurity content, notably in the case of MER ratios of more than 10, and in particular of more than 20 or even 30. Crystallization of the hemihydrate comes of increasingly poor quality, which required an increase in the total acidity ($P_2O_5+SO_3$) in the conversion slurry in order to remedy this poor crystallization. Inevitably this causes an increasingly high content of free $SO_3$ in the slurry and the formation of a production phosphoric acid increasingly strongly polluted with sulfuric acid.

The object of the present invention is to develop a method for producing phosphoric acid by attack of poor quality phosphated rock by means of sulfuric acid which allows a quality production phosphoric acid and a good $P_2O_5$ extraction yield from the rock to be obtained. This method should further be able to be easily applied in an existing standard installation and therefore not requiring costly and indefensible transformations, economically speaking.

In order to solve these problems, provision is made according to the invention for a method for producing phosphoric acid, comprising attack in an aqueous medium of phosphated rock with sulfuric acid at a first temperature comprised between 70 and 90° C. with formation of a first slurry of calcium sulfate dihydrate crystals suspended in an acid aqueous phase, the acid aqueous phase of this slurry having a free $P_2O_5$ content comprised between 38 and 50% by weight and a free $SO_3$ content of less than 0.5% and greater than 0.05% by weight, conversion of this first slurry by heating to a temperature above 90° C., with solubilization of the calcium sulfate dihydrate crystals and recrystallization of the solubilized calcium sulfate giving rise to a second slurry formed with calcium hemihydrate crystals suspended in an aqueous phase based on phosphoric acid, and separation in the second slurry between a production phosphoric acid, having a free $SO_3$ content of less than 2% and greater than 0.05% by weight, and a separation cake based on calcium sulfate hemihydrate, this method further comprising, during the attack, an addition of a fluorine source in the first slurry with a 1% to 5% weight content of F relatively to the $P_2O_5$ contained in the phosphated rock.

In the present patent application, it should be understood that the free phosphoric acid and free sulfuric acid contents are expressed in free $P_2O_5$ and free $SO_3$.

Quite unexpectedly, as this will be explained subsequently, the method according to the invention gives rise during the attack step under the specified conditions to a slurry of dihydrate crystals, while one skilled in the art would expect the formation of hemihydrate. The dihydrate crystallization is not optimum, the crystals are small, they have a grain size having a $d_{50}$ of less than 20 µm. In the presence of a phosphated rock having a $(Al_2O_3+Fe_2O_3+MgO)/P_2O_5 \times 100$ ratio of more than 10, in particular more than 20, notably of the order of 30, it is noted that crystallization of gypsum becomes a problem. It is further noted that after adding the fluorine source, advantageously directly in the tank for attack of the phosphated rock, crystallization of dihydrate is affected, the crystals becoming not only small but further heterogeneous. Such a slurry would have a very low filtration coefficient and therefore would not be able to be exploited industrially in a process requiring its filtration. This aspect is however of no importance according to the invention since this first slurry is not intended to be filtered.

The attack conditions are such that they provide a substantially stoichiometric reaction between the introduced sulfuric acid and the calcium contained in the phosphated rock, mainly in the form of calcium carbonate and phosphate. The acid aqueous phase of this first slurry resulting from the attack contains no or extremely little free sulfuric acid and its free $P_2O_5$ content is quite high.

Advantageously, the attack temperature may be comprised between 70 and 80° C.

Preferentially, the free $P_2O_5$ concentration resulting from the attack step may be from 40 to 45% by weight.

The free $SO_3$ concentration of the acid aqueous phase of the first slurry may be from 0.1 to 0.4% by weight.

This first slurry is then directly subject, in its totality, to a conversion step which consists of heating it to a temperature above 90° C., preferably comprised between 90 and 105° C. This heating in a known way causes solubilization of the gypsum crystals, release of $P_2O_5$ co-crystallized from gypsum during the attack step and recrystallization of the calcium sulfate as hemihydrate.

It is noted that after adding a fluorine source, advantageously directly into the tank for attacking the phosphated rock, the subsequent conversion of the first slurry of dihydrate into hemihydrate becomes easier, which is expressed by a reduction in the acidity required for this conversion.

A second slurry is thus obtained in a simple and easy way, wherein the hemihydrate crystals have a spherical shape and are of a common size, for example having a $d_{50}$ of 60 µm, which gives a filtration cake having an excellent filtration coefficient.

By adding a fluorine source, it is possible, even under the conditions of a phosphated rock with a high rate of impurities, to obtain proper crystallization of the hemihydrate without having to necessarily add sulfuric acid.

The production acid has an extremely low free $SO_3$ content advantageously of the order of 0.05% to less than 1% by weight, which makes it a quality phosphoric acid. It is possible to advantageously obtain a production phosphoric acid having a free $P_2O_5$ content from 35 to 45% by weight.

According to an embodiment of the invention, the step for converting the first slurry does not comprise any addition of sulfuric acid. However it may be contemplated that the method comprise during the step for converting the first slurry, introduction of sulfuric acid into the latter. The amount of added sulfuric acid should however be metered accurately so that, after filtration of the second slurry, the production phosphoric acid contains a free $SO_3$ content of less than 2% by weight, preferably of the order of 0.05 to 1% by weight, in particular of the order of 0.05 to less than 1% by weight. It is important not to exceed this content in order not to pollute phosphoric acid with sulfuric acid which would make it unsuitable for use as a phosphoric acid and would require a desulfation step.

By fluorine source, should be understood according to the invention any composition capable of releasing fluorine into the slurry of the attack. For example $CaF_2$ or further a product from recovery of a fluorinated effluent may be contemplated. It is possible to contemplate the metered addition of a compound obtained as a product from the neutralization of fluorinated effluents, which has been precipitated by a calcium compound such as calcium carbonate or oxide. The solid material decanted and separated from the effluent may be directly introduced into the attack tank.

According to a preferred embodiment of the invention, the method comprises the attack step in a first reactor, and a transfer of the first slurry from the first reactor to a second reactor, in which is carried out the conversion step with formation of the second slurry, the separation step being carried out on a filter. This method has the advantage of being able to be used in an existing installation for producing phosphoric acid by standard attack with sulfuric acid. The first reactor is the attack reactor of the standard installation, wherein different attack conditions are applied. The second reactor is the ripening reactor of the standard installation. As an enlargement of the gypsum grains resulting from the attack is not necessary according to the invention, it is possible to use this ripening reactor as a conversion reactor. Finally the filter of the standard installation may be used for filtering the hemihydrate instead of gypsum. This filter may be any known suitable filtration device, for example a band filter, a device with filtering cells arranged as a carrousel, inter alia.

The method according to the invention is advantageously carried out continuously. Preferably the dwelling time in the first reactor is from 2 to 4 hours and the dwelling time in the second reactor is from 0.5 to 1.5 hours. The dwelling times correspond to the dwelling times in the attack and ripening reactors of a standard installation.

Other embodiments of the invention are indicated in the appended claims.

Other details and particularities of the invention will become apparent from the description given hereafter, not as a limitation, but with reference to the appended drawings.

Figure 1:
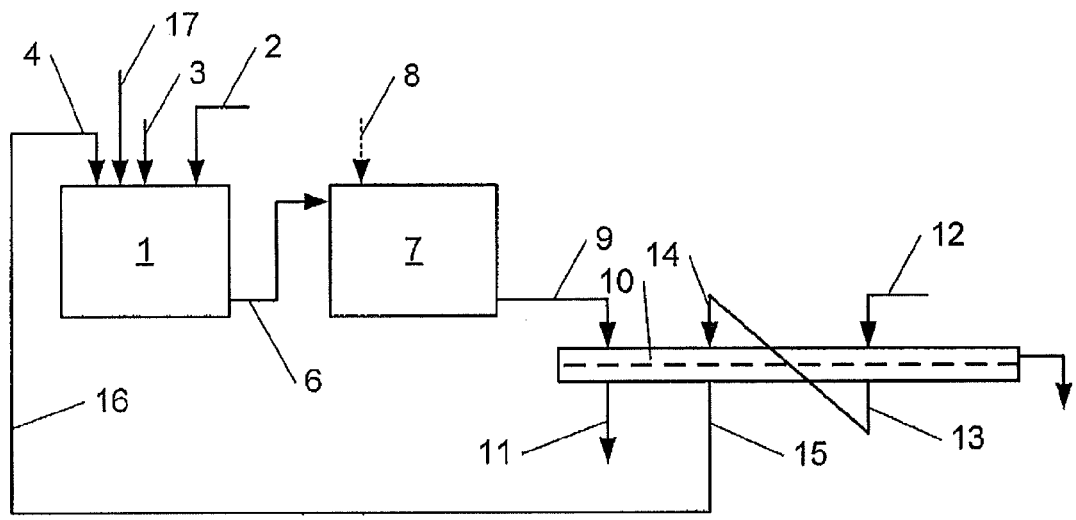
FIG. 1 illustrates as a flow diagram, an exemplary installation applying a method according to the invention.

The installation illustrated in FIG. 1 comprises an attack reactor 1 in which crushed phosphated rock having an MER ratio of the order of 20-32 is introduced in 2 and sulfuric acid in 3, for example 98-99 wt % concentrated sulfuric acid. A composition including 52% by weight of CaO and 21% of F is for example advantageously introduced in 17 into the reactor 1.

The operating conditions applied in this reactor are the following:
Temperature: 70-80° C.
Free $P_2O5\%$: 38-50% by weight
Free $SO_3\%$: 0.05%-<0.5% by weight
Dwelling time: 2-4 h.

Unlike what is expected by one skilled in the art, very fine heterogeneous but stable dihydrate crystals are obtained.

Figure 2:
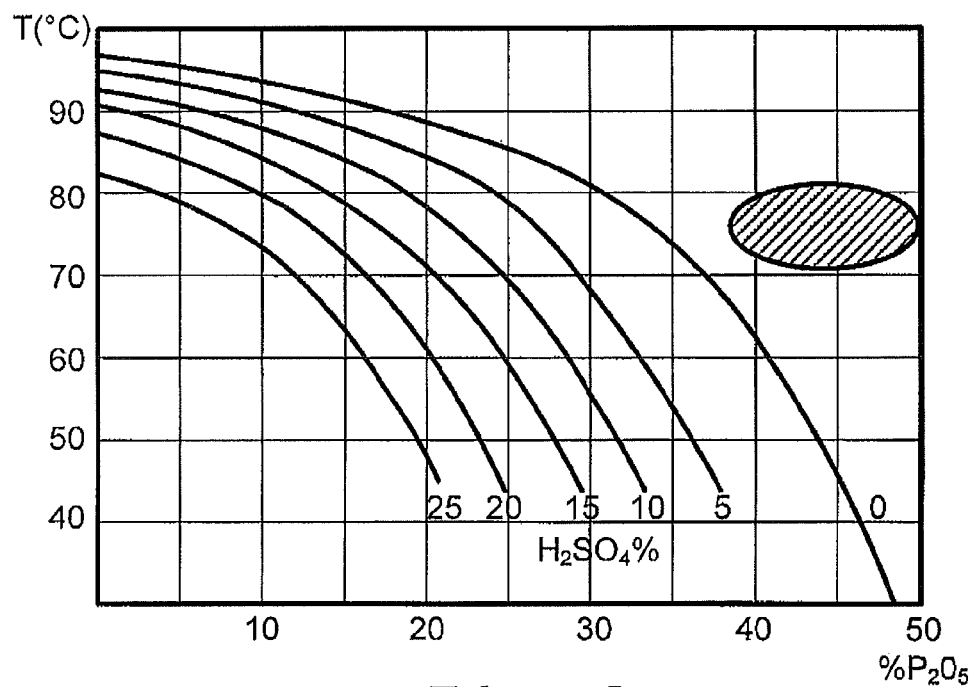
FIG. 2 is a graph illustrating regions for the formation of dihydrate and of hemihydrate versus temperature, $P_2O_5$ concentration and $SO_3$ concentration.

Indeed, FIG. 2 may now be consulted. The illustrated graph is extracted from A. V. Slack, Phosphoric Acid, Vol. 1, Part I, ed. Marcel Dekker Inc., 1968, New York. The temperature in ordinates is indicated in ° C., the $P_2O_5$ and $SO_3$ concentrations in abscissae. The curves illustrate the equilibrium between dihydrate and hemihydrate. The region of the graph located below these curves corresponds to the conditions for forming dihydrate, those located above these curves to those for forming hemihydrate. The hatched ellipse illustrates the area meeting the preferential conditions of the attack according to the present invention. Unlike what is provided by examining this graph, a stable slurry of dihydrate and not hemihydrate crystals is obtained according to the invention.

Figure 3:
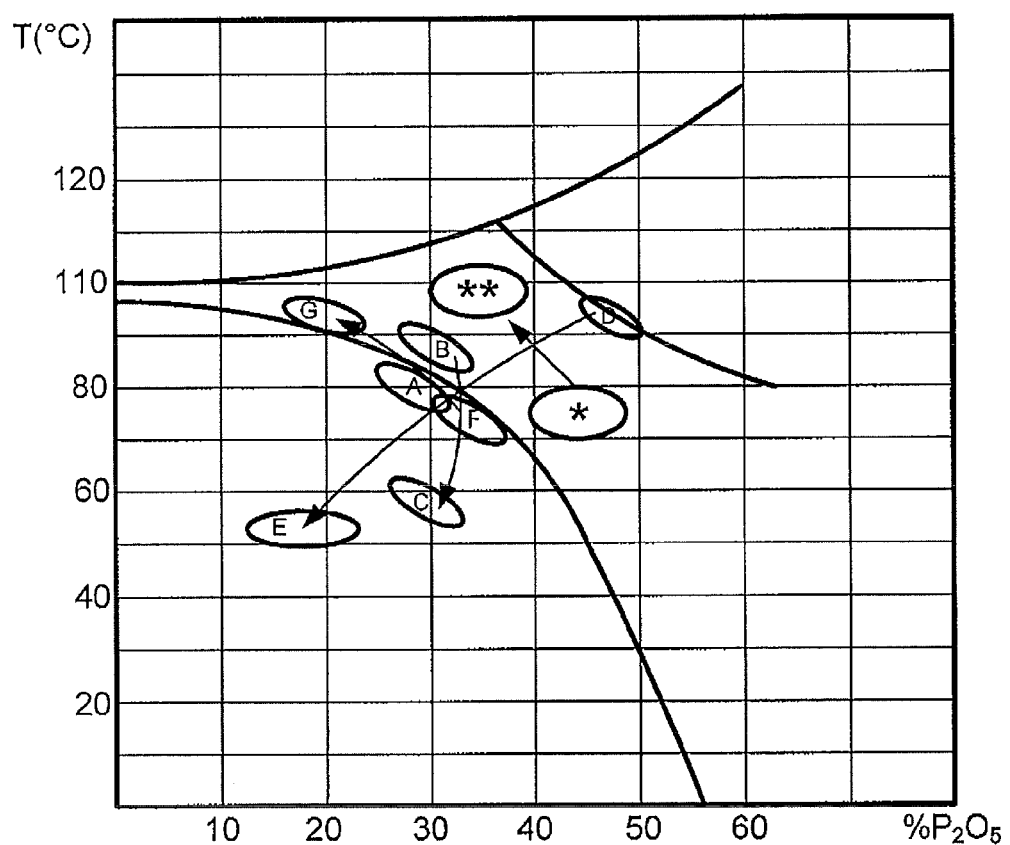
FIG. 3 is a graph which illustrates the different processes applied for producing phosphoric acid by sulfuric attack.

The same conclusion may be drawn upon examining the graph of FIG. 3 extracted from P. Becker, Phosphates and Phosphoric Acid. $2^{nd}$ ed., Marcel Dekker Inc., 1989, New York—Basle. In this graph, the temperature is indicated in ordinates and the $P_2O_5$ concentration in abscissae. In the lower left corner of the graph is found the region for forming the dihydrate, in the right upper corner is found the region for forming anhydrite and between both, the region for forming hemihydrate. The area A corresponds to the conditions of the standard method with formation of gypsum. The areas B and C, connected by an arrow, and D and E connected by an arrow, correspond to the conditions of two methods first forming hemihydrate and then converting the latter into dihydrate. The areas F and G connected by an arrow illustrate the conditions of a method first forming dihydrate and then converting the latter into hemihydrate.

The ellipse marked with an asterisk meets the attack conditions according to the invention and the ellipse marked with two asterisks connected to the first by an arrow, fits the conversion conditions according to the invention.

According to the general knowledge of one skilled in the art, the formation of hemihydrate could therefore be expected in both areas corresponding to these two ellipses, which is not the case and this is already surprising per se.

The totality of the gypsum slurry obtained in the reactor 1 is then transferred through the conduit 6, provided with transfer means known per se, to a conversion reactor 7. In this reactor, the following operating conditions are applied:
Temperature: 90-105° C.
$P_2O_{5\%}$: 35-45% by weight
$SO_3\%$: 0.1%-<1.0% by weight
Dwelling time: 0.5-1.5 h.

In order to heat this reactor, common means may be applied, for example direct heating, injection of steam into the conversion medium or a combination of both. Any other suitable heat source may of course be used for this purpose. Under the effect of the increase of heat, the crystals of gypsum solubilize, the co-crystallized $P_2O_5$ is released and the calcium sulfate recrystallizes as relatively pure hemihydrate crystals.

According to an alternative method, it is possible in order to further improve the conversion of gypsum into hemihydrate, to add in the conversion reactor 7 a small metered amount of sulfuric acid. This amount should however be such that the free $SO_3$ content in the production acid be less than 2% by weight, preferably 1%. The production acid cannot be polluted by this addition of sulfuric acid.

The illustrated method comprises a transfer of the slurry of the reactor 7 through the conduit 9 to a filter 10 of a common type.

In a first section of the filter, a filtrate is obtained in 11, which is production phosphoric acid and a filtration cake.

The illustrated method comprises two steps for washing the cake. The second washing is carried out with a washing liquid which is preferably water, supplied in 12.

The product of this washing obtained in 13 is an aqueous solution with a low phosphoric acid content which is used as washing liquid supplied in 14 to the first washing step. The product of this first washing, obtained in 15, is an aqueous solution of phosphoric acid which may be recycled in 4 to the attack reactor 1, via a recycling conduit 16.

As compared with the so-called standard method, the method according to the invention provides the advantage of an improved extraction yield, given the recrystallization and the production of an acid with a high $P_2O_5$ content, with a content of more than 35% by weight, instead of the 25 to 30% obtained with the standard method, and this in spite of the high content of impurities of the initial rock. The dry hemihydrate cake is well recoverable in industry. Its packing properties are excellent, since in the presence of water or humidity, the hemihydrate reconverts into gypsum. These improvements are obtained in a simple way in an existing installation, without increasing the congestion thereof. The method further allows recycling of an industrial waste, of a fluorinated industrial effluent, but also taking out a function therefrom, which is beneficial for the method.

The method according to the invention will be described below in a more detailed way by means of non-limiting exemplary embodiments.

EXAMPLE 1

A pilot test was conducted with a sedimentary phosphate from Central Asia containing 17% of $P_2O_5$, 29% of CaO, 2% of F, 34.7% of $SiO_2$, and a MER of 32.

The grain size distribution of the crushed rock was close to the one generally used in phosphoric acid plants (99.8% passing through 500 μm, 60% passing through 150 μm and 40% passing through 75 μm).

Two cases are to be distinguished:
a) in the attack tank, the phosphate is introduced without any external fluorine source.
b) in the attack tank, a mixture of phosphate with an external fluorine source (advantageously a product from the recovery of formulated industrial effluents) is introduced in order to facilitate the dihydrate-hemihydrate conversion.
  a) The phosphate is introduced into the attack reactor with a volume of 30 liters by a feeding screw and the throughput (3.2 kg/h) is controlled by a weight loss system. Two metering pumps inject sulfuric acid (1.1 kg/h) and the recycled acid from the washing of the filtration cake of the hemihydrate slurry (12 kg/h).

The attack of the phosphate with sulfuric acid was carried out under the following conditions:

$P_2O_5$ content: 39.1% by weight
$SO_3$ excess: 0.46% by weight
Temperature: 80° C.
Solids content: 32% by weight The output flow rate of the attack pulp is of about 11 l/h. The average dwelling time in the attack reactor (calculated as being the ratio between the volume of the reactor and the output flow rate of the dihydrate slurry) is therefore of about 30 l/11 l/h=2.7 hours. Under these conditions, a stable slurry of small size dihydrate crystals ($d_{50}$ less than 20 μm) is obtained, with a monomodal size distribution. These are mainly isolated crystals but cross- and star-shaped crystals are also observed. These crystals, which would have very poor filterability, are not filtered in the relevant method.

The gypsum slurry obtained during this first step is then heated up to 101° C. in a second 15 liter reactor. A second addition of sulfuric acid (about 892 g/h) is carried out so as to be able to obtain, in the presence of a high rate of impurities in the attack slurry, conversion of the gypsum crystals into hemihydrate. The free $SO_3$ content required for this conversion is 7% by weight. It is only under these extreme $SO_3$ conditions, characterized by a « total acidity » (% $P_2O_5$+% $SO_3$) of 45% by weight, that recrystallization of the gypsum into hemihydrate was able to be obtained.

Crystals with a spherical shape and characterized by $d_{50}$=42 μm were obtained.

The thereby produced phosphoric acid contains 38% by weight of $P_2O_5$ and 7% by weight of free $SO_3$. If such an operating procedure was used, a desulfation step for the acid would be required, which should be avoided according to the invention.

b) In the second case, the working parameters are similar to the previous case, but a mixture of the phosphate with 10% by weight (relatively to $P_2O_5$) of a product from the recovery of fluorinated industrial effluents (equivalent to 5% by weight of F) is introduced into the attack tank. The dihydrate-hemihydrate conversion is clearly easier and, at the same temperature of 101° C., it is attained for a « total acidity » (% $P_2O_5$+% $SO_3$) of 38% by weight, which allows observance of an $SO_3$ content in the production phosphoric acid of less than 2% by weight. Under these conditions, the method of this invention is applicable.

The produced phosphoric acid contains 36.2% by weight of $P_2O_5$ and 1.8% by weight of free $SO_3$. The filtration cake of the obtained hemihydrate contains a $P_2O_5$ total content of 0.54% by weight which corresponds to a total $P_2O_5$ extraction yield (attack and filtration) of 97.8% by weight. The free water content of the hemihydrate cake is 22.9%. The crystallization water is of 6.4%, which is typical for hemihydrate, and X-ray diffraction actually confirms that this is hemihydrate.

EXAMPLE 2

A slurry formed with calcium sulfate and phosphoric acid titrating by weight 4.16% of $P_2O_5$, 0.4% of $SO_3$, 0.24% of $Al_2O_3$, and 0.99% of F is obtained by attack of a North African phosphate.

It is stable, at least for a duration of 8 hours, as dihydrate when the temperature is 78° C.

Next, it is subject to addition of sulfuric acid in steps of 0.2%. When the $SO_3$ content in the liquid phase is 0.6%, both phases (dihydrate and hemihydrate) are stable and co-exist. When the $SO_3$ content in the liquid phase is 0.8% of $SO_3$, the conversion into hemihydrate is complete, the hemihydrate phase is the stable form from now on. Conversion is confirmed by observing crystals under the microscope, by measuring the crystallization water (6.18%) and X-ray diffraction (XRD).

It should be understood that the present invention is by no means limited to the embodiments described above and that many modifications may be provided thereto within the scope of the appended claims.

The invention claimed is:

1. A method for producing phosphoric acid, comprising attack in an aqueous medium of phosphated rock with sulfuric acid at a first temperature comprised between 70 and 90° C., with formation of a first slurry of calcium sulfate dihydrate crystals suspended in an acid aqueous phase, the acid aqueous phase of this slurry having a free $P_2O_5$ content comprised between 38 and 50% by weight and a free $SO_3$ content from 0.05% to 0.4% by weight, an addition of a fluorine source in the first slurry in a content of 1% to 5% by weight of F relatively to the $P_2O_5$ contained in the phosphated rock taking place during the attack,
conversion of this first slurry by heating to a temperature above 90° C., with solubilization of the calcium sulfate dihydrate crystals and recrystallization of the solubilized calcium sulfate giving rise to a second slurry formed with calcium sulfate hemihydrate crystals suspended in an aqueous phase based on phosphoric acid, and
separation in said second slurry between a production phosphoric acid, having a $P_2O_5$ content from higher than 35% to 45% by weight and a free $SO_3$ content of less than 2% and greater than 0.05% by weight, and a separation cake based on calcium sulfate hemihydrate.

2. The method according to claim 1, wherein the phosphated rock has a weight ratio ($Al_2O_3$+$Fe_2O_3$+MgO)/$P_2O_5$×100 greater than 10.

3. The method according to claim 2, wherein said fluorine source is a product from the recovery of a fluorinated effluent obtained by neutralization and precipitation of this fluorinated effluent with a calcium compound, this precipitated composition being introduced into said first slurry.

4. The method according to claim 1, comprising, during the step for converting the first slurry, introduction of sulfuric acid into said first slurry.

5. The method according to claim 1, wherein the step for converting the first slurry does not comprise any addition of sulfuric acid.

6. The method according to claim 1, comprising the attack step in a first reactor and a transfer of the first slurry from the first reactor to a second reactor in which is carried out the conversion step, with the formation of the second slurry, the separation step being carried out on a filter.

7. The method according to claim 6, wherein heating the first slurry occurs by direct heating of the second reactor, by injecting steam into the second slurry, or by both of these processes simultaneously.

8. The method according to claim 6, comprising a dwelling time in the first reactor from 2 to 4 hours and a dwelling time in the second reactor from 0.5 to 1.5 hours.

9. The method according to claim 1, wherein is carried out continuously.

10. The method according to claim 1, wherein the obtained production phosphoric acid has a free $SO_3$ content in a range greater than 0.05% to 1% by weight.

* * * * *